United States Patent [19]
Harada et al.

[11] Patent Number: 6,049,558
[45] Date of Patent: Apr. 11, 2000

[54] OPTICAL ELEMENTS FOR GUIDING LASER LIGHT AND LASER SYSTEMS COMPRISING SAME

[75] Inventors: Masaki Harada; Soichi Owa; Tomoko Ohtsuki, all of Tokyo, Japan

[73] Assignee: Nikon Corporation, Tokyo, Japan

[21] Appl. No.: 09/031,417

[22] Filed: Feb. 26, 1998

[30] Foreign Application Priority Data

Feb. 28, 1997 [JP] Japan ................................ 9-061832

[51] Int. Cl.⁷ ............................................. H01S 3/08
[52] U.S. Cl. ............................ 372/107; 372/9; 372/26; 372/34; 372/69; 372/103; 372/108; 372/98; 372/99
[58] Field of Search ................................ 372/66, 92, 98, 372/107, 6, 108, 69, 68, 71, 75, 99, 70, 21, 9

[56] References Cited

U.S. PATENT DOCUMENTS

| | | |
|---|---|---|
| Re. 34,729 | 9/1994 | Sipes, Jr. . |
| 3,230,474 | 1/1966 | Keck et al. ................................ 372/70 |
| 3,258,717 | 6/1966 | Katzman ................................... 372/68 |
| 3,534,291 | 10/1970 | Chernoch et al. ......................... 372/70 |
| 3,731,225 | 5/1973 | Wild et al. ................................. 372/6 |
| 3,779,628 | 12/1973 | Kapron et al. ......................... 372/64 X |
| 4,114,592 | 9/1978 | Winston . |
| 5,038,359 | 8/1991 | Pepper et al. .............................. 372/21 |
| 5,048,026 | 9/1991 | Shaw et al. ................................ 372/66 |
| 5,086,433 | 2/1992 | Pocholle et al. .......................... 372/72 |
| 5,127,068 | 6/1992 | Baer et al. . |
| 5,307,430 | 4/1994 | Beach et al. . |
| 5,359,622 | 10/1994 | Shih ........................................ 372/108 |
| 5,363,221 | 11/1994 | Sutton et al. .............................. 372/21 |
| 5,402,437 | 3/1995 | Mooradian . |
| 5,859,868 | 1/1999 | Kyusho et al. ............................ 372/75 |

*Primary Examiner*—Leon Scott, Jr.
*Attorney, Agent, or Firm*—Klarquist Sparkman Campbell Leigh & Whinston, LLP

[57] ABSTRACT

Laser systems, and optical elements for laser systems, are disclosed for providing a pumped laser light with improved output efficiency while having simple construction and simple alignment adjustment. A pump light flux from a diode pumping laser irradiates and thus pumps a solid-state laser crystal. The irradiation by the pump light flux is coaxial with an output laser beam produced by the laser crystal. The pump light flux is conducted by an optical element, preferably frustoconical in shape with an entrance face larger than an exit face, that functions as a light funnel. The entrance face is disposed proximal to the pumping laser 11, and the exit face is disposed proximally to the laser crystal 14. A portion of the pump light flux entering the entrance face passes through the optical element without being reflected by a side surface of the optical element. The remaining pump light flux reflects at least once by the side surface during passage through the optical element. The exit face has a shape corresponding to the desired laser mode shape of the output laser beam.

28 Claims, 4 Drawing Sheets

OPTICAL ELEMENTS FOR GUIDING LASER LIGHT AND LASER SYSTEMS COMPRISING SAME

FIELD OF THE INVENTION

This invention pertains to pumping optical systems for end-pumped lasers provided with a pumping optical system that guides pumping light to a laser medium and to laser systems comprising such pumping optical systems.

BACKGROUND OF THE INVENTION

According to conventional wisdom, end-pumped lasers in which the pump light is incident on the laser medium coaxially with the laser output are more efficient than side-pumped lasers in which the pump light is incident on the side of the laser medium.

A typical end-pumped laser consists of a solid-state laser medium (i.e., laser crystal) that is pumped with light produced by one or more semiconductor lasers. In comparison with solid-state lasers that are pumped by lamps, such a laser is more compact in size. Such lasers also exhibit higher power efficiency, longer useful life, and greater ease of operation and maintenance.

Figure 6:
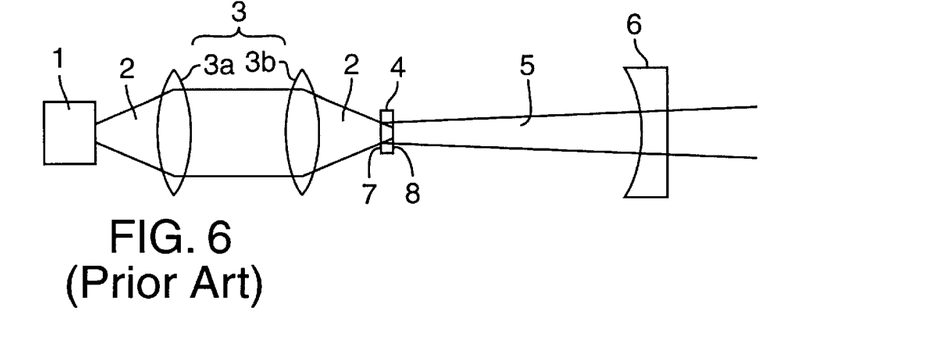
FIG. 6 is a schematic diagram showing a conventional laser system.

With reference to FIG. 6, a conventional end-pumped solid-state laser system, excited by a diode laser, is shown. The laser system comprises a pump laser 1 (e.g., semiconductor diode laser) that produces a pump light flux 2. The pump light flux 2 passes through a pump optical system 3 to a solid-state laser medium 4. The pump light flux 2 is incident upon the laser medium 4 coaxially with a laser beam 5 produced by the laser medium. The laser beam 5 is transmitted by a partially reflective mirror 6.

A pump end of the laser medium 4 (i.e., the left-hand surface in the figure) comprises a surficial coating 7. The coating 7 exhibits a high reflectivity to the laser beam 5 and is transmissive to the pump light flux 2. A coating 8 is also applied to an exit surface (i.e., the right-hand surface in the figure) of the laser medium 4. The coating 8 is transmissive to the laser beam 5. The partially reflective mirror 6 and the coating 7 define a resonant cavity.

Further with respect to FIG. 6, the pump optical system 3 includes condensing lenses 3a, 3b that converge the pump light flux 2 onto the laser medium 4 according to a so-called "lens method." Other known methods for delivering the pump light flux 2 to the laser medium 4 include a "proximity method" in which the pump laser 1 is situated close to the laser medium 4, and a "fiber method" in which the pump light flux is guided to the laser medium 4 using one or more optical fibers. In the fiber method, first fiber end(s) are situated adjacent the pumping laser and second fiber end(s) can be placed proximally to the laser medium 4. Alternatively, lenses can be used to direct the pump light flux 2 from the second end(s) of the fibers to the laser medium 4.

Conventional lasers using the lens method, proximity method, or fiber method have several limitations.

First, the emission region of a semiconductor pump laser is generally asymmetric, with typical dimensions of about 500 μm×1 μm. The divergence of the emission is similarly anisotropic. As a result, the pump laser tends to illuminate a similarly shaped region of the laser medium 4, thereby limiting the efficiency and quality of the laser beam 5 produced by the laser medium 4. For example, the laser beam 5 can operate in a $TEM_{00}$ mode, and a dilated pump light flux 2 can include light that is incident to the laser medium 4 outside a region corresponding to the laser beam 5 (e.g., having a circular transverse profile) produced by the laser medium 4. In such an instance, the pump light flux 2 is not fully utilized for pumping, yielding a reduced pumping efficiency. Also, excitation of the laser medium 4 outside the area required for $TEM_{00}$-mode emission can cause the resulting laser beam 5 produced by the laser medium 4 to be a higher-order transverse mode.

If the pump light flux 2 is sufficiently condensed to illuminate only a portion of the laser medium 4 compared to the laser beam 5, then the flux density of the pumping light flux 2 is excessively large. Absorption by the laser medium 4 of a pump light flux 2 having an excessively high flux density results in localized absorption saturation of the laser medium 4, which reduces efficiency.

In addition, if the portion of the laser medium 4 illuminated by the pump light flux 2 is small (e.g., the illumination portion is long and narrow) even though the cross-sectional profile of the pump light flux remains intact, then heat distribution in the laser medium 4 is non-uniform. This causes an asymmetric thermal lensing effect that distorts the laser beam 5.

The foregoing problems have been addressed in several ways in the conventional art. According to one approach, the transverse profile of the pump-light flux is made circular using prisms or cylindrical lenses. This approach increases the complexity of the pumping optical system, increases the time and effort required for alignment, and increases pump-light energy losses by reflection, etc., at the surfaces of the additional prisms or lenses of the pumping optical system.

In another approach, fiber methods are exploited that utilize multiple fibers. A first set of fiber ends is bundled and placed so as to match the shape of the emissive surface of the pumping laser, and an opposing second set of fiber ends is bundled in a shape (e.g., circular) corresponding to the desired laser-mode profile. This approach tends to avoid the problems that arise in proximity methods and lens methods. However, with respect to conventional fiber methods, especially such methods in which the fiber ends are placed in close proximity to the pumping laser, the size of the first set of bundled fiber ends is determined by the thickness of each constituent fiber, and the bundled fiber ends often extend outside the region corresponding to the circularly shaped laser beam 5 on the laser medium 4. In such instances, problems arise that are similar to problems encountered with conventional lens systems.

Accordingly, when utilizing a conventional fiber system, pump light flux is typically passed through a lens after being guided by the fibers. In such a system, the transverse profile of light produced by the bundled second set of fiber ends can be enlarged or contracted by the lens to cause the pumping light flux to be exactly and fully within the region on the laser medium 4 corresponding to the transverse shape of the laser beam 5. Unfortunately, in such a system, the lens must be aligned very accurately with the fiber ends and with the laser medium to obtain maximal irradiation of the laser medium 4. Such alignment adjustments are troublesome to perform accurately.

In addition, in conventional laser systems, a portion of the pumping energy is typically dissipated as heat in the laser medium 4. To efficiently remove such heat, the laser medium 4 is typically mounted on a metallic or other heat-dissipating body having good thermal conductivity. However, because the heat-dissipating body is a separate component from the pumping optical system, the parts count, and thus the cost, are higher.

SUMMARY OF THE INVENTION

In view of the shortcomings of conventional systems as summarized above, an object of the present invention is to provide laser apparatus exhibiting improved output efficiency of laser light.

Other objects are to provide laser apparatus that prevent deterioration in the quality of the laser light by appropriately pumping a laser medium with high efficiency, and to provide laser apparatus having simple construction in which adjustments and alignments can be simply and easily performed.

Yet another object of this invention is to provide a low-cost laser apparatus that can, using a simple structure, effectively dissipate heat from the laser medium.

According to a first aspect of the invention, a laser system is provided that emits an output laser beam along an axis. The laser system comprises a laser medium, a pump light source, and a pumping optical system. The pump light source produces a pump light flux that propagates along the axis. The laser medium is arranged coaxially with the axis so as to receive and be laser-pumped by the pump light flux and thereby produce an output laser beam. The pumping optical system is situated so as to receive the pump light flux from the pump source and direct the pump light flux along the axis to the laser medium.

To such end, the pumping optical system comprises an optical element having an input, a side surface, and an output. The pump light flux enters the optical element through the input, passes axially through the optical element, and exits the output to the laser medium. The pump light flux exiting the output comprises a first portion that passed through the optical element without reflection from the side surface, and a second portion that reflected at least once from the side surface during passage through the optical element. The output has a shape corresponding to an intended transverse laser mode of the output laser beam produced by the laser medium.

The optical element can be formed of a solid material that is transparent to the pump light flux. The input of such an optical element comprises an entrance end face, and the output comprises an exit end face. Extending between the entrance end face and the exit end face is a side wall.

Alternatively, the optical element can be defined by a bore extending through a thickness dimension of a solid body. The input of such an optical element comprises an entrance aperture and the output comprises an exit aperture. Extending between the entrance aperture and the exit aperture is a side wall. The bore can have any of various shapes such as a tapered profile from the entrance aperture to the exit aperture. The solid body can comprise a metal plate in which the bore extends through the thickness dimension of the metal plate.

As suggested above, the optical element can have, without any particular limitation, any of various shapes, for example a frustoconical shape or cylindrical shape. The input (entrance end face or entrance aperture) can have any of various sizes and shapes as required (e.g., circular, elliptical, rectangular, polygonal, etc.), so long as the input has a size and shape on which substantially all the pump light flux can be incident. The output (exit end face or exit aperture) preferably has a size and shape corresponding to the desired laser mode of the laser medium (e.g., circular in the case of a $TEM_{00}$ mode).

The side wall is preferably smooth so as to prevent losses when light reflects therefrom. A smooth side wall also ensures that the intensity distribution of the pump light flux exiting the output is substantially uniform. The side wall can comprise a surficial coating, if necessary, that is reflective to the pump light flux passing through the optical element.

It is preferred that the input of the optical element be disposed in close proximity to the pump light source and that the output be disposed in close proximity to (or actually contacting) the laser medium.

Because the pump light flux exiting the output comprises a first portion that passed through the optical element without reflection from the side surface, and a second portion that reflected at least once from the side surface during passage through the optical element, the optical element functions differently than an optical fiber (as used in conventional systems). Namely, essentially all the light transmitted through an optical fiber is reflected multiple times from a side wall during propagation through the fiber. Furthermore, with an optical element according to the invention, substantially no pump light is lost during passage through the optical element, even if the light-emission surface of the pump light source is long and narrow.

Because the distribution of divergence angles of the pump light flux is anisotropic, when the pump light flux exits from the output of the optical element, the transverse profile of the exiting light flux matches the shape of the output (e.g., exit aperture or exit end face) and has a substantially uniform intensity distribution. Also, the output preferably matches the size and shape of the desired laser mode of the output laser beam from the laser medium. As a result, spread of pump light into non-effective regions of the laser medium is prevented, thereby mitigating absorption saturation and non-uniformity of heat distribution in the laser medium. Another benefit is that the laser medium can be pumped efficiently, thereby improving the output efficiency of the laser medium as well as the quality of the output laser beam.

By disposing the input and output of the optical element proximally with respect to the pump light source and the laser medium, respectively, the pumping light optical system of the laser system can consist solely of the optical element without a need for lenses and the like. This simplifies the constitution and reduces the cost of a pumping light optical system. Furthermore, the optical element does not function as a lens and does not focus light. Thus, use of the optical element provides a large range and ease of alignment and adjustment.

As noted above, a first portion of the light passing through the optical element is not reflected at all from the side wall and a second portion is reflected only once or a very few times. As a result, if the incident pump light flux is polarized, the polarization direction and the polarization coefficient of the pumping light exiting the output are not changed substantially from the polarization direction and polarization coefficient, respectively, of the pump light flux incident on the input. Consequently, if the laser medium such as $Nd:YVO_4$ is used (in which polarization is dependent on the optical absorption rate, and the absorption rate and pumping efficiency in one polarization direction is large), drops in pumping efficiency due to unwanted changes in polarization state are prevented, hence improving pumping efficiency.

In conventional optical fibers, in contrast, the number of internal reflections is extremely large; thus, the polarization direction of the transmitted light typically shifts so greatly that the light becomes virtually unpolarized. In such an instance, if a laser medium were used that was polarization-dependent, then pumping efficiency would be seriously degraded.

Incidentally, losses in conventional optical-fiber systems cannot be avoided when coupling from the pump light source to the optical fiber. Also, the pump light source and optical fiber must be aligned very accurately relative to each other to attain maximal optical coupling efficiency. Laser systems according to the present invention, in contrast, do not require such highly accurate alignment, especially whenever the optical element is placed in close proximity to the pump light source and the laser medium as summarized above. Also, laser systems according to the present invention do not exhibit losses when the pump light flux is incident upon the input.

Although, as indicated above, it is preferred that the input and output of the optical element be disposed in close proximity to the pump light source and the laser medium, respectively, such close proximity is not required. For example, an optical fiber can be disposed between the pump light source and the optical element, in which instance the pumping light system would comprise the optical element and the optical fiber. Such a configuration does not offer the advantages of maintaining the polarization state of the pump light flux, preventing losses when coupling into the fiber, and relaxing the stringent accuracy required for aligning the pump light source with the optical fiber; however, such a configuration permits increased latitude with which the pump light source can be placed with respect to the optical element, without engendering the problems characteristic of conventional proximity systems and lens systems.

As indicated above, in a conventional pumping light system comprising an optical fiber, the pump light flux passes through a lens after exiting the optical fiber. In a laser system according to the present invention that includes an optical fiber, in contrast, a lens is not required. Rather, the pump light flux is shaped by the optical element as the pump light flux exits the optical fiber. The optical element is not a lens and does not function as a lens. Consequently, the need for highly accurate positional alignment of the optical element, and time and effort required for making such alignments, are substantially reduced compared to conventional systems. In addition, because the pump light flux is shaped by the optical element after being guided by the optical fiber, constraints on the size of the optical fiber are eliminated.

In embodiments in which the optical element is formed of a solid material with an entrance end face and an exit end face, at least one of the end faces can be curved rather than planar. Providing such curvature enables the respective end face to function similarly to a lens. This can provide increased latitude in changing the conditions of transmission and reflection of the pump light flux. Alternatively, both end faces can be planar.

In embodiments in which the optical element is defined by a bore extending through the thickness dimension of a solid body, the side wall of the bore is reflective with respect to the pump light. The pump light enters the entrance aperture, passes through the bore, and exits from the exit aperture. As the pump light flux propagates through the bore, a first portion of the light passes through without reflection from the side wall, and a second portion passes through while reflecting at least once from the side wall. In any event, the exit aperture has a shape corresponding to an intended laser-mode shape of the output laser beam from the laser medium. Because an optical element according to the invention configured as a bore functions similarly to an optical element according to the invention formed from a solid material, both are substantially equivalent and achieve the same advantages. An optical element configured as a bore has the additional advantage of not exhibiting any reflection of pump light flux from an entrance end face or an exit end face.

The material defining an optical element configured as a bore can be a metal. Suitable metals include metals that exhibit good thermal conductivity. Thus, the metal material can be disposed so as to actually contact the laser medium so as to effectively conduct heat away from the laser medium. Such a configuration reduces the number of components in the laser system and thus lowers cost.

The side wall of an optical element configured as a bore can include a surficial coating if required to improve reflectivity to the pump light flux passing through the optical element. Such a coating eliminates constraints on the material in which the bore is formed and thus increases freedom in the design.

The pump light source can be a semiconductor laser (diode laser). Such a pump light source provides advantages such as compact size, high efficiency, long service life, and excellent commercial viability compared to lamps and the like that can also be used as the pump light source.

Optical elements according to the present invention can be used in any of various systems in which an incident light flux is shaped into a desired transverse profile having a uniform distribution of light intensity.

The foregoing and other features and advantages of the invention will become more apparent from the following detailed description of example embodiments which proceeds with reference to the accompanying drawings.

DETAILED DESCRIPTION

For convenience, an orthogonal X-Y-Z coordinate system is used to describe example embodiments of the subject invention. The X, Y, and Z axes are shown in FIGS. 1–5.

The invention is described in connection with multiple example embodiments of the invention, which represent the current best mode of the invention.

EXAMPLE EMBODIMENT 1

Figure 1A:
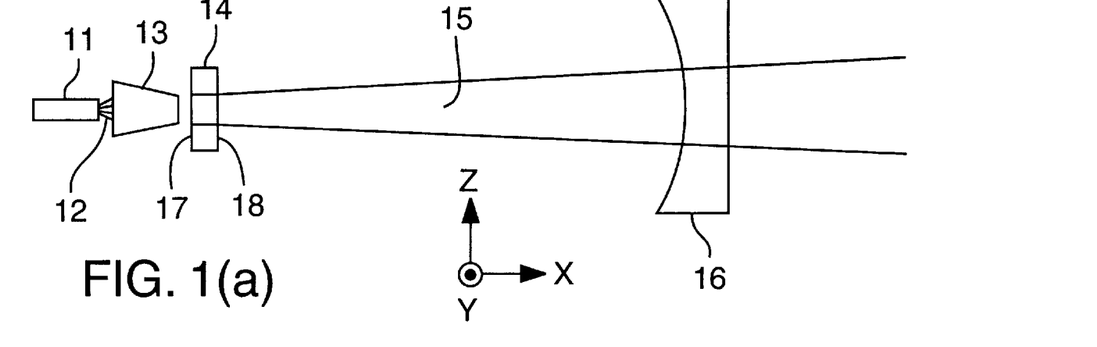
FIG. 1(a) is a schematic drawing showing certain features of a laser system according to Example Embodiment 1.

A laser system (i.e., an end-pumped, diode-pumped laser) according to this example embodiment is shown in FIG. 1. The laser system comprises a diode laser 11 that produces a pump light flux 12. A laser crystal 14 serves as a laser medium that, when appropriately pumped, produces an output laser beam 15. An optical element 13 is situated between the diode laser 11 and the laser crystal 14 and functions as a light funnel. The optical element 13 serves as a pumping optical system that guides the pump light flux 12 to the laser crystal 14 so that the pump light flux 12 is incident upon the laser crystal 14 coaxially with the output laser beam 15. A partially reflective mirror 16, transmissive to the output laser beam 15, is situated downstream of the laser crystal 14. An upstream surface (pump-end surface; i.e., left-hand surface in FIG. 1(a)) of the laser crystal 14 includes a surficial coating 17 that is totally reflective with respect to the output laser beam 15 and non-reflective with respect to the pump light flux 12. A downstream surface (light-emitting surface; i.e., right-hand surface in FIG. 1(a)) of the laser crystal 14 includes a surficial coating 18 that is non-reflective with respect to the output laser beam 15. Thus, a laser resonant cavity is formed between the partially reflective mirror 16 and the coating 17.

It will be apparent that a non-linear optical medium can be placed between the laser crystal 14 and the partially reflective mirror 16 to change the wavelength of the output laser beam 15, if required.

The diode laser 11 is preferably a gallium arsenide semiconductor diode laser that produces a pump light flux (i.e., a laser beam) at a wavelength of about 809 nm. The emissive surface of the diode laser 11 (parallel to the YZ plane) has a long, narrow emission region measuring about 1 $\mu$m (parallel to the Z-axis) by 500 $\mu$m (parallel to the Y-axis). By way of example and not intending to be limiting, the beam divergence of the pump light flux 12 (i.e., full width at half maximum, abbreviated "FWHM") has an anisotropic spread of around 40° (angle at the inner surface parallel to the XZ plane)×10° (angle at the inner surface parallel to the XY plane).

In this example embodiment, the laser crystal 14 is preferably a 0.6-mm thick $YVO_4$ crystal with 3% Nd doping. Such a laser crystal is denoted as $Nd:YVO_4$. Absorption of an incident light flux by a $Nd:YVO_4$ laser crystal depends upon the polarization of the incident light flux. It will be apparent that other laser media alternatively can be used for the laser crystal 14, such as (but not limited to) Nd:YLF or Nd:YAG. Nd:YLF exhibits a polarization-dependent absorption, and Nd:YAG does not.

Figure 1B:
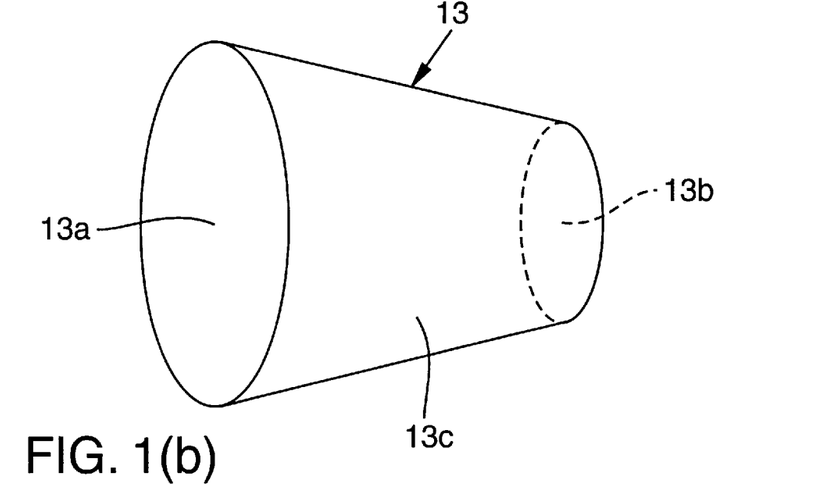
FIG. 1(b) is an enlarged perspective view of the optical element of the FIG. 1(a) embodiment.

The optical element 13 is preferably made of glass, plastic, or other material transparent to the pump light flux 12. Referring to FIG. 1(b), the optical element 13 is preferably frustoconical in shape, including end faces 13a, 13b (wherein the end face 13a has a larger diameter than the end face 13b) and conical side 13c. The side 13c can be surficially coated with a reflective metal or a dielectric coating. The end faces 13a, 13b can be surficially coated with an anti-reflective coating. If the output laser beam 15 is in a $TEM_{00}$ mode, then the end face 13b from which the pump light flux 12 propagates to the laser crystal 14 is preferably circular so as to correspond to the $TEM_{00}$ laser mode. If the output laser beam 15 is in a higher-order mode, then the shape of the end face 13b preferably corresponds to the profile of the higher-order mode. In any event, the end face 13a is preferably shaped so as to capture and transfer substantially all of the pump light flux 12 to the laser crystal 14. Thus, the end face 13a can have any of various shapes and sizes as required.

In a frustoconical optical element 13, the end face 13a is preferably approximately 600 $\mu$m in diameter and the end face 13b is preferably approximately 400 $\mu$m in diameter.

The length of the optical element 13, measured parallel to the X-axis, is preferably approximately 1 mm. The end face 13a is preferably situated proximally to the emissive surface of the diode laser 11 and the end face 13b is preferably situated proximally to the laser crystal 14. The pump light flux 12 exiting the diode laser 11 is directed by the optical element 13 to the laser crystal 14 to pump the laser crystal 14.

Figure 1C:
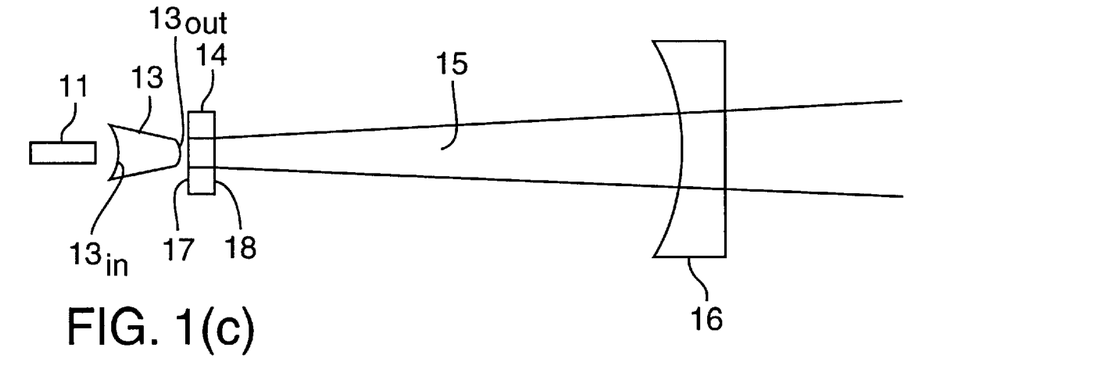
FIG. 1(c) is an illustration of an alternative optical element for the laser system of Example Embodiment 1.

Referring to FIG. 1(c), an exit face $13_{out}$ of the optical element 13 can be convex, concave, or otherwise nonplanar. Similarly, an entrance $13_{in}$ can be convex, concave, or otherwise nonplanar. One or both of the faces $13_{in}$, $13_{out}$ can be either concave, convex, or planar.

Figure 2A:
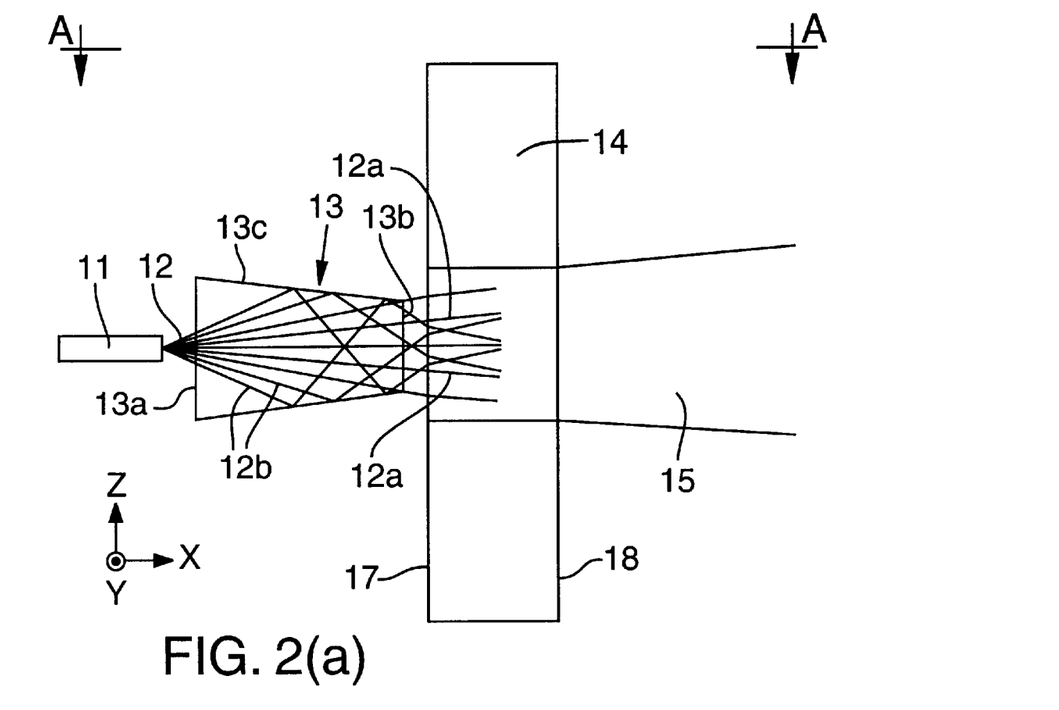
FIG. 2(a) is an enlarged view of a portion of the laser system shown in FIG. 1(a), illustrating the operation of the optical element shown in FIG. 1(b).

Propagation of the pump light flux 12 in the XZ-plane through the optical element 13 is described with reference to FIG. 2(a). Rays of the pump light flux 12, from the diode laser 11, that are close to the optical axis (such as exemplary rays 12a) are transmitted by the optical element 13 to the laser crystal 14 without reflecting from the side 13c. Other rays of the pump light flux 12 (such as exemplary rays 12b) are reflected by the side 13c one or more times before reaching the laser crystal 14. The portions of the pump light flux 12 that are reflected from the side 13c are incident to the side 13c at an angle that is larger that the critical angle so that such portions are reflected with low loss.

In the XZ-plane, the divergence angle (FWHM) of the pump light flux 12 from the diode laser 11 is about 40° as described above. Because most of the pump light flux 12 is emitted with a cone of angular radius of 20° from the optical axis, most of the pump light flux is either transmitted directly through the optical element 13 (without reflecting from the side 13c) to the laser crystal 14 or passed through the optical element 13 while being reflected by the side 13c one or more times.

Figure 2B:
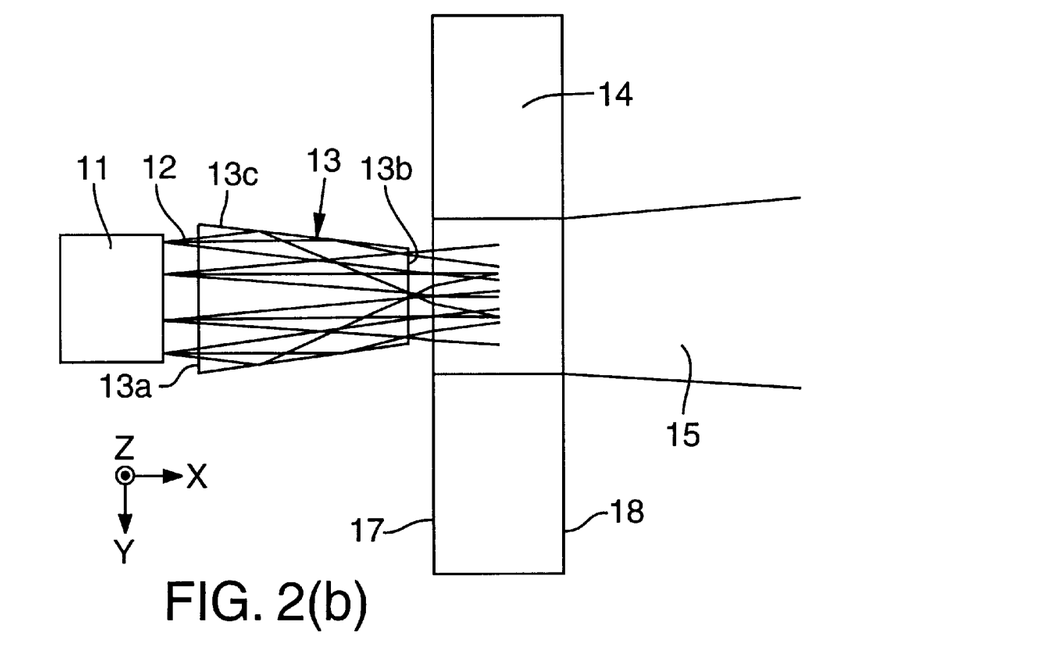
FIG. 2(b) is a sectional view (along the line A—A) of the portion of the laser system shown in FIG. 2 (a).

Propagation of the pump light flux 12 in the XY-plane is described with reference to FIG. 2(b). The diode laser 11 has an emissive surface that is preferably 500 $\mu$m wide in the Y direction. In FIG. 2(b), four emission locations are plotted as being representative of the propagation of the pump light flux 12. The divergence angle (FWMM) of the pump light flux 12 from the diode laser 11 in the XY plane is approximately 10° as described above. Rays of the pump light flux 12 emerging from near the center, in the Y direction, of the emissive area of the diode laser 11 reach the laser crystal 14 by being transmitted intact through the optical element 13 without being reflected by the side 13c.

A portion of the pump light flux emerging from peripheral areas in the Y direction is reflected once by the side 13c of the optical element 13. Such light reaches the laser crystal 14 after the optical path of the light flux is directed by reflection toward the interior of the optical element. Nevertheless, there is no loss because total-reflection conditions prevail in the optical element 13.

As is clear from an examination of the behavior of the pump light flux 12 in the XZ plane and the XY plane, the pump light flux 12 emerging from the end face 13b of the optical element 13 is a mixture of direct light (i.e., light transmitted directly through the optical element 13 without being reflected from the side 13c) and reflected light (i.e., light that has passed through the optical element 13 after having been reflected by the side 13c). The transverse profile of the light is nearly circular. Thus, there is no region of the transverse profile in a which optical intensity is particularly concentrated relative to other regions. Because the pump light flux does not propagate far from the end face 13b, the pump light flux has a diameter of around 400 $\mu$m (which is the diameter of the end face 13b). The distance between the end face 13b and the laser crystal 14 is around 100 μm. Because the pump light flux propagates only some 100 μm into the laser crystal 14, nearly all of the pump light flux is absorbed by the laser crystal 14. Because the pump light flux does not propagate far into the laser crystal 14, the diameter of the pump light flux does not become significantly greater than 400 μm even inside the laser crystal 14.

In this embodiment, the transverse diameter of the output laser light 15 is preferably 600 μm. Substantially all the pump light flux 12 stays within such a diameter, which enables efficient pumping of the laser crystal 14. Because the intensity distribution of the pump light flux is nearly uniform across the transverse plane, absorption saturation (resulting from excessive pumping density) and astigmatic thermal lensing do not occur. Consequently, the laser crystal 14 can be pumped efficiently to improve the efficiency with which the output laser light is produced and to prevent deterioration in the quality of the output laser light.

Because the pumping optical system of this example embodiment comprises the optical element 13, the construction of the pumping optical system is extremely simple and low in cost. Also, because the optical element 13 differs from a lens in that the optical element 13 does not refract the pump light flux, the permissible range over which the optical element 13 can be moved for alignment purposes is large, thereby simplifying alignment adjustments.

Although the polarization direction of the pump light flux at each reflection is displaced from the original polarization direction of the flux (as output from the diode laser 11), the amounts of displacement are small. As described above, because most of the pump light flux is transmitted directly through the optical element 13 or is reflected only once during passage through the optical element 13, the polarization direction and the polarization ratio of the pump light flux radiated from the optical element 13 is not significantly displaced from the polarization direction and polarization ratio, respectively, of the pump light flux produced by the diode laser 11. Consequently, pumping of the laser crystal 14 can be performed efficiently even though Nd:YVO$_4$ (which has a large absorption coefficient in one polarization direction) is the preferred material for the laser crystal 14.

By making the end face 13a of the optical element 13 an appropriate size, losses when the pump light flux 12 is incident upon the end face 13a can be minimized. Also, the need for highly accurate alignment of the optical element 13 relative to the diode laser 11 is obviated.

Applying an anti-reflective coating to the end face 13a and the end face 13b of the optical element 13 can also reduce losses of pump light flux 12.

Reflection from the side 13c of the optical element 13, particularly whenever total-reflection conditions are not satisfied, can be maintained at high efficiency by applying a reflective coating (metallic film and/or multi-layer dielectric film) on the side 13c, as described above.

The optical element 13 may be endowed with a lens effect by making one or both end faces 13a and 13b not planar but rather concave or convex. The resulting lens effect can be exploited to change the transmission and reflection conditions of the pump light flux 12.

EXAMPLE EMBODIMENT 2

Figure 4:
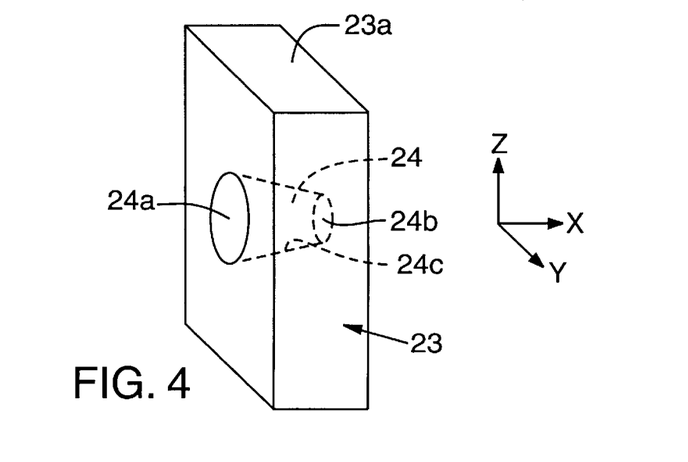
FIG. 4 is an enlarged perspective view of an optical element of the type shown in FIGS. 3(a)–3(b).

The configuration of an optical element 23 according to this example embodiment, for delivering a pump light flux to a laser medium, is shown in FIG. 4. The optical element 23 comprises a metallic body 23a defining a tapered hole 24.

It is apparent that the metallic body 23a need not be plate-like in overall configuration, but can alternatively have any of various other configurations. The optical element 23 can be used in a laser system as shown in FIG. 1(a) in place of the optical element 13.

The hole 24 is preferably frustoconical with an entrance aperture 24a, an exit aperture 24b, and a tapered inner surface 24c, wherein the entrance aperture 24a has a greater diameter than the exit aperture 24b. The inner surface 24c is preferably optically polished, smoothed, or appropriately coated for greater efficiency in reflecting light propagating through the hole 24 from the entrance aperture 24a to the exit aperture 24b.

In this example embodiment, because the output laser light 15 is produced in the TEM$_{00}$ mode, the shape of the exit aperture 24b is preferably circular to correspond to the TEM$_{00}$ mode. The entrance aperture 24a can be any of various shapes (e.g., circular, elliptical, rectangular, polygonal, etc.) and sizes so long as it allows essentially all the pump light flux 12 to be incident thereon. As an alternative to a frustoconical shape, the hole 24 can alternatively have any of various other shapes such as cylindrical, or frusto-pyramidal, with the apertures 24a and 24b shaped accordingly. The inner surface 24c is preferably smooth to ensure that the intensity distribution of the pump light flux is roughly uniform at the exit aperture 24b and that losses of pump light are minimized during reflection.

In this example embodiment, the diameter of the entrance aperture 24a (that receives the pump light flux) is preferably 600 μm and the diameter of the exit aperture 24b (from which the pump light flux exits) is preferably 400 μm. The axial length of the hole 24 (i.e., length along the X-axis, normally equal to the thickness of the body 23a) is preferably about 1 mm. In this example embodiment, the diode laser 11 and the laser crystal 14 (FIG. 1(a)) preferably have the same shapes and sizes as described above for Example Embodiment 1.

The entrance aperture 24a is normally situated proximally to the output face 11a of the diode laser 11, and the exit aperture 24b is normally situated proximally to or in contact with the laser crystal 14.

In this example embodiment, the pump light flux 12 illuminates the laser crystal 14 through the hole 24, thereby providing pumping energy to the laser crystal 14.

Figure 3A:
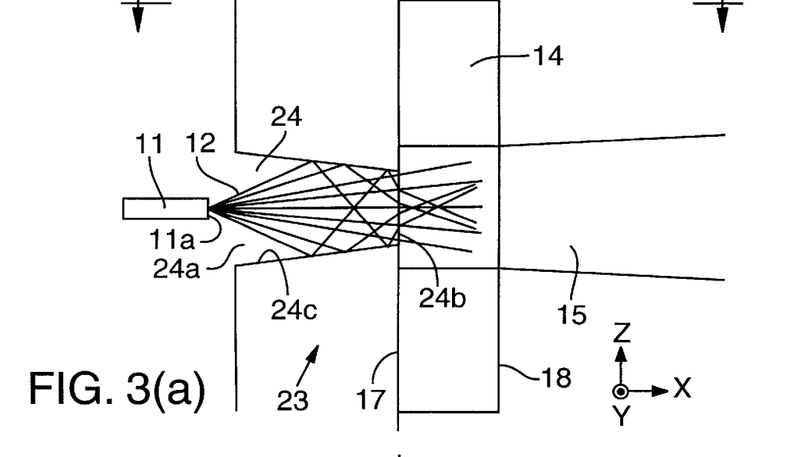
FIG. 3(a) is an enlarged view of a portion of a laser system according to Example Embodiment 2.

With reference to FIG. 3(a), the pump light flux 12 exits the output face 11a of the diode laser 11 and propagates along the X-axis in the XZ plane. Portions of the pump light flux 12 propagating close to the X-axis pass directly through the hole 24, without reflecting from the inner surface 24c, to the laser crystal 14. Portions of the pump light flux 12 that are comparatively displaced from the X-axis are usually reflected one or more times from the inner surface 24c before reaching the laser crystal 14. Because the FWHM divergence angle of the pump light flux 12 emitted from the diode laser 11 is approximately 40° in the XZ plane, almost all of the pump light flux is emitted within a range of ±20° from the optical axis. Consequently, practically none of the optical energy of the pump light flux is reflected by the inner surface 24c; rather, such pump light is transmitted directly through the hole 24 or is reflected only once from the inner surface 24c as the pump light flux passes through the hole 24. Pump light flux 12 emitted from the diode laser 11 at still greater angles is reflected multiple times from the inner surface 24c as the pump light flux passes through the hole 24.

The reflectivity of a metal surface is typically between 90% and 95%. Thus, any pump light flux 12 that reflects from the inner surface 24c is attenuated in proportion to the number of reflections. Because most of the pump light flux 12 arrives at the laser crystal 14 either unreflected or after only one reflection, losses from attenuation remain small. An advantageous effect is realized from the fact that no losses arise from reflection at an incident end face and at an exit end face.

Figure 3B:
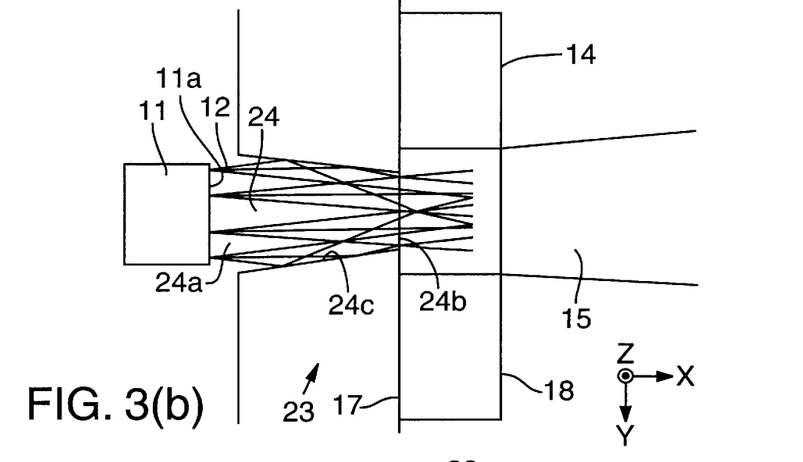
FIG. 3(b) is a sectional view (along the line B—B) of the portion of the laser system shown in FIG. 3(a).

With reference to FIG. 3(b), the pump light flux 12 propagates along the X-axis in the XY-plane. The output face 11a is preferably 500 μm long in the Y-direction. For convenience, four locations on the output face 11a are shown in FIG. 3(b) for illustrating the propagation of the pump light flux 12 in the XY plane. The divergence angle (FWHM) of the pump light flux 12 from the output face 11a in the XY plane is approximately 10° as described above. Rays of the pump light flux 12 emerging at or near the center of the output face 11a pass directly through the hole 24, without reflecting from the inner surface 24c, to reach the laser crystal 14. Some of the pump light flux 12 emerging from peripheral regions (in the Y direction) of the output face 11a is reflected at least once by the inner surface 24c before reaching the laser crystal 14.

An examination of the behavior of the pump light flux 12 in the XZ plane and the XY plane reveals that pump light 12 emerging from the exit aperture 24b is a mixture of "direct light" (i.e., light passing directly through the optical element 23 without being reflected from the inner surface 24c) and "reflected light" (i.e., light passing through the optical element 23 while being reflected at least once by the inner surface 24c).

The transverse profile of the pump light flux 12 exiting the optical element 23 is nearly circular. Hence, there is no region of the transverse profile of the pump light flux that has an optical intensity that is significantly more or less concentrated than other regions. The transverse diameter of the pump light flux 12 passing out of the exit aperture 24b is about equal to the diameter of the exit aperture 24b (e.g., an exit-aperture diameter of 400 μm produces a pump light flux having a diameter of about 400 μm).

Substantially all the pump light flux is absorbed by the laser crystal 14. For example, absorption is nearly complete after the pump light flux penetrates only about 100 μm into the laser crystal 14. Since the pump light flux does not penetrate deeply into the laser crystal 14, the diameter of the pump light flux does not significantly increase upon entering the laser crystal 14.

In this example embodiment, the diameter of the output laser beam 15 is 600 μm. Essentially all the pump light flux is within this diameter. Hence, pumping is efficient. Because the intensity distribution of the pump light flux is nearly uniform, absorption saturation (resulting from an excessive pumping density) and astigmatic thermal lensing do not occur. Hence, the laser crystal 14 can be pumped with high efficiency, the efficiency with which the laser crystal 14 produces the output laser beam 15 is improved, and deterioration in the quality of the output laser beam 15 is prevented.

Because the pumping optical system of this example embodiment comprises the optical element 23, the construction of the pumping optical system is simple and inexpensive. Also, because the optical element 23 is not a lens and hence does not refract light, its alignment-adjustment range is large, thus simplifying alignment adjustments.

Although the polarization direction of light at each reflection from the inner surface 24c is displaced from the incident polarization direction, such displacements tend to be small with this example embodiment. As described above, because most of the pump light flux passes directly through the optical element 23 or is reflected only once with passage therethrough, the polarization direction and the polarization ratio of the pump light flux exiting the exit aperture 24b are not significantly changed from the polarization direction and polarization ratio, respectively, of the light entering the entrance aperture 24a from the diode laser 11. Consequently, pumping of the laser crystal 14 can be performed efficiently even though Nd:YVO$_4$, which has a large absorption coefficient in a one polarization direction, is preferably used as the laser crystal 14.

Providing the entrance aperture 24a with sufficient diameter can prevent losses when the pump light flux 12 is incident upon the entrance aperture 24a. This can also eliminate the need for high accuracy in the positional adjustment of the optical element 23 relative to the diode laser 11.

The body 23a (preferably made from a metal) preferably contacts the laser crystal 14. Such contact, as well as the excellent thermal conductivity of many metals, enables the optical element 23 to efficiently dissipate any heat generated in the laser crystal 14. I.e., the optical element 23 serves a dual purpose as a light pipe and a heat radiator. Such dual functionality reduces the parts count of the overall laser system and lowers costs compared to having to provide a separate heat sink or the like to dissipate heat from the laser crystal 14.

EXAMPLE EMBODIMENTS 3–5

Figure 5A:
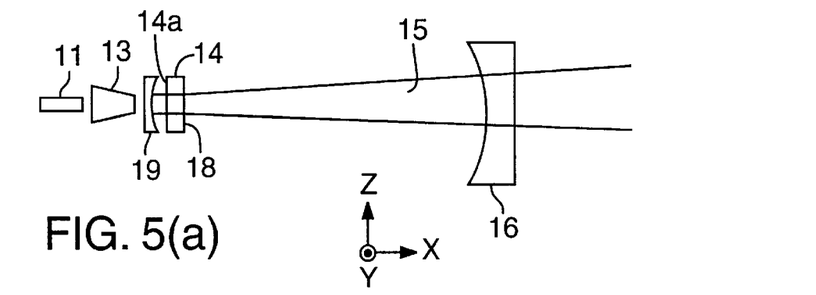
FIGS. 5(a)–5(c) are schematic diagrams showing certain features of Example Embodiments 3–5, respectively.
Figure 5B:
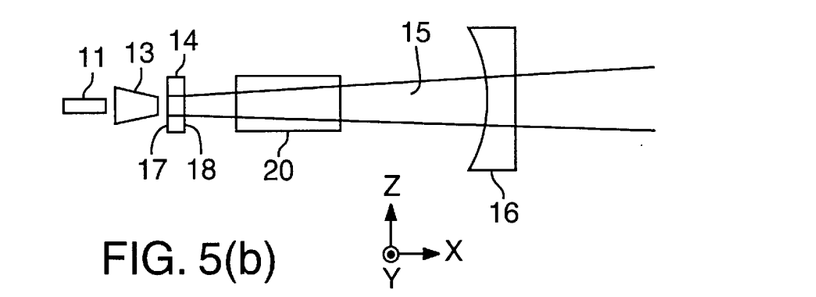
Figure 5C:
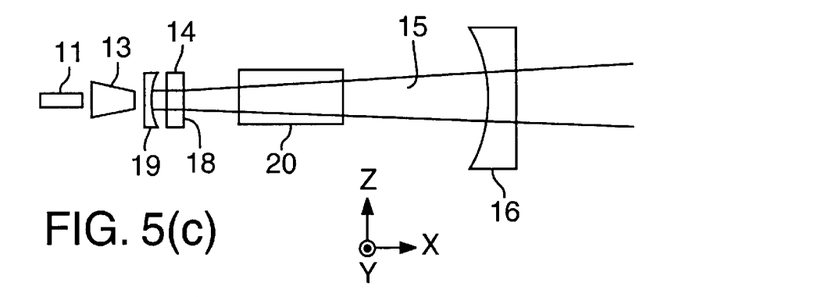

These example embodiments are depicted in FIGS. 5(a)–5(c), respectively. Components in FIGS. 5(a)–5(c) that are similar to corresponding components shown in FIG. 1(a) have the same reference designators and are not described further.

In Example Embodiment 3 shown in FIG. 5(a), the incident face 14a of the laser crystal 14 lacks a coating 17 (FIG. 1(a)). Instead, a laser resonance mirror 19 is disposed between the optical element 13 and the laser crystal 14. The laser resonance mirror 19 is non-reflective with respect to the pump light flux and totally reflective with respect to the output laser beam 15. The output laser beam 15 is continuous-wave, similar to the output laser beam 15 produced by the FIG. 1(a) embodiment.

In Example Embodiment 4 shown in FIG. 5(b), an acousto-optical modulator 20 is disposed between the laser crystal 14 and the partially reflective mirror 16. Thus, the output laser beam 15 is pulsed, based on the well-known Q-switched method.

In Example Embodiment 5 shown in FIG. 5(c), the incident face 14a of the laser crystal 14 lacks a coating 17 (FIG. 1(a)). Instead, a laser resonance mirror 19 is disposed between the optical element 13 and the laser crystal 14. The laser resonance mirror 19 is non-reflective with respect to the pump light flux and totally reflective with respect to the output laser beam 15. An acousto-optical modulator 20 is disposed between the laser crystal 14 and the partially reflective mirror 16. Consequently, the output laser beam 15 is pulsed, based on the well-known Q-switched method.

Other than the features summarized above, the laser systems of Example Embodiments 3–5 are identical to the laser system of Example Embodiment 1. With Example Embodiments 3–5, advantageous effects similar to those of Example Embodiment 1 are realized.

As an alternative to the optical element 13, each of Example Embodiments 3–5 can employ the optical element 23 of FIG. 4. It is also possible, if necessary, in Example Embodiments 3–5 to place a nonlinear crystal between the laser crystal 14 and the partially reflective mirror 16 to perform wavelength conversion.

It will be understood that this invention is not limited to the specific example embodiments described above. For example, in Example Embodiments 1–5, the pumping optical system comprises only the optical element 13 or the optical element 23. An optical fiber can be disposed between the diode laser 11 and the optical element 13 or 23. In such an instance, the pumping light optical system would comprise the optical element 13 or 23 and the optical fiber. Such a configuration increases the degrees of freedom with which the diode laser 11 can be disposed relative to other components. Such a configuration would also eliminate problems that could occur in proximity-type lens systems. However, similar to the conventional system described above that utilizes an optical fiber, including an optical fiber can cause problems with maintaining the polarization state of the pump light flux, preventing losses of light when coupling the optical fiber, and preventing a loss of alignment accuracy of the fiber and pumping light source.

The present invention differs from conventional optical-fiber systems that pass the pump light flux through an optical fiber and a lens. Notably, a laser system according to the invention that includes an optical fiber shapes the pump light flux by passing the pump light flux through the optical element immediately after the pump light flux has passed through the optical fiber. This results in a significant reduction in time and effort required for alignment adjustments. Because an optical fiber is not a lens, the accuracy with which the position of the optical element must be adjusted is substantially reduced. Also, because the pump light flux is shaped by the optical element after passing through the optical fiber, constraints on the thickness of the optical fiber are eliminated.

The optical elements 13, 23 are not limited to use only in laser systems. The optical elements 13, 23 can also be used in any of various applications in which incident light must be shaped into a desired cross-sectional shape having a uniform distribution of optical intensity.

Thus, an apparatus according to this invention has substantial utility in improving the output efficiency of laser light and preventing deterioration of the quality of laser light. The subject apparatus achieve such ends by appropriately and efficiently pumping a laser medium, while providing laser apparatus having simple construction and simple alignment. The subject apparatus also effectively dissipate the heat of a laser medium, effectively shape incident laser light into a desired transverse profile having a uniform distribution of optical intensity, and provide laser systems that have simple construction and simple alignment and adjustments.

Whereas the invention is described in connection with multiple example embodiments, it will be apparent that the invention is not limited to those example embodiments. On the contrary, the invention is intended to encompass all modifications, alternatives, and equivalents as may be included within the spirit and scope of the invention as defined by the appended claims.

What is claimed is:

1. A laser system that emits an output laser beam along an axis, the laser system comprising:
    (a) a laser medium and a pump light source that produces a pump light flux propagating along the axis, the laser medium being arranged coaxial with the axis so as to receive and be laser-pumped by the pump light flux and thereby produce an output laser beam; and
    (b) a light guide situated next to the pump light source so as to receive the pump light flux from the pump light source and direct the pump light flux along the axis to the laser medium, the light guide having an input, a side surface, and an output, wherein the pump light flux enters the light guide through the input, passes axially through the light guide, and exits the output to the laser medium, the pump light flux exiting the output comprising a first portion that passed through the light guide without reflection from the side surface and a second portion that reflected at least once from the side surface during passage through the light guide, the output having a shape corresponding to an intended transverse laser mode of the output laser beam produced by the laser medium.

2. The laser system of claim 1, wherein the pump light source includes a diode laser that produces the pump light flux.

3. The laser system of claim 2, wherein:
    light guide is formed of a solid material that is transparent to the pump light flux,
    the input of the light guide comprises an entrance end face, and the output of the light guide comprises an exit end face, and
    the light guide comprises a side wall.

4. The laser system of claim 3, wherein at least one of the entrance end face and the exit end face is not planar.

5. The laser system of claim 4, wherein at least one of the entrance end face and the exit end face is convex.

6. The laser system of claim 4, wherein at least one of the entrance end face and the exit end face is concave.

7. The laser system of claim 3, wherein the entrance end face and the exit end face each have an antireflective coating and the side wall has a reflective coating.

8. The laser system of claim 2, wherein the laser medium is a solid-state laser medium.

9. The laser system of claim 8, wherein the laser medium is a crystal.

10. The laser system of claim 2, wherein the light guide is frustoconical in shape, wherein the input has a larger diameter than the output.

11. The laser system of claim 2, wherein the output has a diameter that is no greater than a diameter of the output laser beam.

12. The laser system of claim 2, further comprising a partially reflective mirror situated axially downstream of the laser medium such that the output laser beam is incident on the partially reflective mirror.

13. The laser system of claim 12, further comprising a laser resonance mirror situated axially between the light guide and the laser medium, the laser resonance mirror being non-reflective with respect to the pump light flux and reflective with respect to the output laser beam.

14. The laser system of claim 13, further comprising an acousto-optical modulator axially situated between the laser medium and the partially reflective mirror.

15. The laser system of claim 1, wherein the light guide is defined by a bore extending through a thickness dimension of a metal plate, the bore having an entrance aperture serving as the input to the light guide, an exit aperture serving as the output to the light guide, and a side wall.

16. The laser system of claim 15, wherein the bore is tapered from the entrance aperture to the exit aperture.

17. The laser system of claim 15, wherein the metal plate contacts the laser medium so as to dissipate heat from the laser medium.

18. The laser system of claim 15, wherein the side wall comprises a surficial coating reflective to the pump light flux passing through the light guide.

19. The laser system of claim 15, wherein the pump light source comprises a diode laser.

20. The laser system of claim 15, wherein the laser medium is a solid state laser medium.

21. The laser system of claim 20, wherein the laser medium is a crystal.

22. The laser system of claim 15, wherein the bore is frustoconical, wherein the input has a larger diameter than the output.

23. The laser system of claim 15, wherein the output has a diameter that is no greater than a diameter of the output laser beam.

24. The laser system of claim 15, further comprising a partially reflective mirror situated axially downstream of the laser medium such that the output beam is incident on the partially reflective mirror.

25. The laser system of claim 24, further comprising a laser resonance mirror situated axially between the light guide and the laser medium, the laser resonance mirror being non-reflective with respect to the pump light flux and reflective with respect to the output laser beam.

26. The laser system of claim 25, further comprising an acousto-optic modulator axially situated between the laser medium and the partially reflective mirror.

27. An optical element for transmitting a light flux, the optical element comprising an input end, an exit end, and a side surface extending between the input end and the exit end, the input end and exit end having respective transverse profiles, the optical element being positionable relative to the light flux such that the light flux is incident at the input end, propagates through the optical element, and exits the exit end, wherein during propagation of the light flux from the input end to the exit end, a first portion of the light flux passes directly through the optical element without reflecting from the side surface, and a second portion of the light flux reflects from the side surface at least once during said propagation, wherein the transverse profile of the exit end differs from the transverse profile of the input end, so as to change the transverse profile of the light flux as the light flux propagates through the optical element from the input end to the exit end.

28. An optical element for transmitting a light flux, the optical element being defined as a bore extending through a metal plate, the bore comprising an entrance aperture, an opposing exit aperture, and a side wall extending between the entrance aperture and the exit aperture, the side wall being reflective with respect to the light flux, the optical element being positionable relative to the light flux such that the light flux is incident at the entrance aperture, propagates through the optical element, and exits the exit aperture, wherein during propagation of the light flux from the entrance aperture to the exit aperture, a first portion of the light flux passes directly through the optical element without reflecting from the side wall, and a second portion of the light flux reflects from the side wall at least once during said propagation.

* * * * *

UNITED STATES PATENT AND TRADEMARK OFFICE
CERTIFICATE OF CORRECTION

PATENT NO. : 6,049,558
DATED : April 11, 2000
INVENTOR(S) : Masaki Harada, Soichi Owa, and Tomoko Ohtsuki It is certified that error appears in the above-identified patent and that said Letters Patent is hereby corrected as shown below:

<u>Title page, item [56]</u>
In the fifth line of U.S. Patent Document, "3,731,225" should be -- 3,371,225 --.

<u>Column 8,</u>
Line 24, "is larger that the" should read -- is larger than the --.
Line 40, "(FWMM)" should read -- (FWHM) --.

<u>Column 14,</u>
Line 21, "light guide" should read -- the light guide --.

Signed and Sealed this

Seventh Day of August, 2001

*Attest:*

NICHOLAS P. GODICI
*Attesting Officer*     *Acting Director of the United States Patent and Trademark Office*